Jan. 26, 1960 P. P. RUPPE 2,922,511
PROPELLING LINKAGE FOR TUBE TYPE CONVEYOR
Filed April 18, 1956 2 Sheets-Sheet 1

INVENTOR.
PETER P. RUPPE
BY
Barnes, Kisselle, Laughlin & Raisch
ATTORNEYS.

Jan. 26, 1960 P. P. RUPPE 2,922,511
PROPELLING LINKAGE FOR TUBE TYPE CONVEYOR
Filed April 18, 1956 2 Sheets-Sheet 2

INVENTOR.
PETER P. RUPPE
BY
ATTORNEYS.

United States Patent Office 2,922,511
Patented Jan. 26, 1960

2,922,511

PROPELLING LINKAGE FOR TUBE TYPE CONVEYOR

Peter P. Ruppe, St. Clair Shores, Mich.

Application April 18, 1956, Serial No. 579,013

2 Claims. (Cl. 198—176)

This invention relates to a tube type conveyor and is especially concerned with the linkage which connects and propels the pistons or the flights through the tube.

This application is a continuation in part of my application Serial No. 365,316 filed July 1, 1953, now Patent No. 2,776,042 dated January 1, 1957.

An object of this invention is to provide a simple, inexpensive linkage which can be used for propelling flights having various shapes through conveyor tubes which curve in various planes.

In accordance with the invention the propelling linkage has a concatenate series of pairs of links, the pairs being alternately transversely spaced apart to accommodate a driving sprocket projection and abutted together and adapted to have a flight removably secured thereto. Adjacent pairs of links are secured together through pin and clevis connecting means which embodies two closely coupled joints. Each joint permits the adjacent pairs of links to be swivelled in one direction relatively to each other, and the axes of the joints are disposed perpendicularly to each other so that the linkage will readily conform to any relatively sharply curved path traced by the conveying tube. One form of the invention is shown in the accompanying drawings which may be briefly described as follows:

Figure 2:
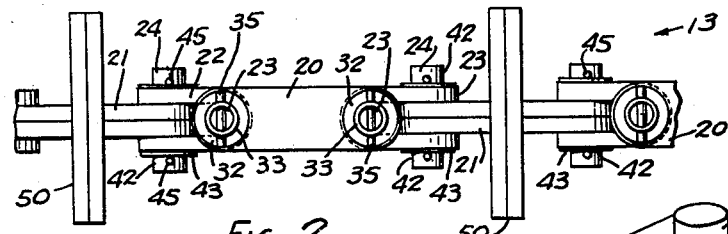
Fig. 2 is an elevational view of the propelling linkage and flights of this invention.
Figure 1:
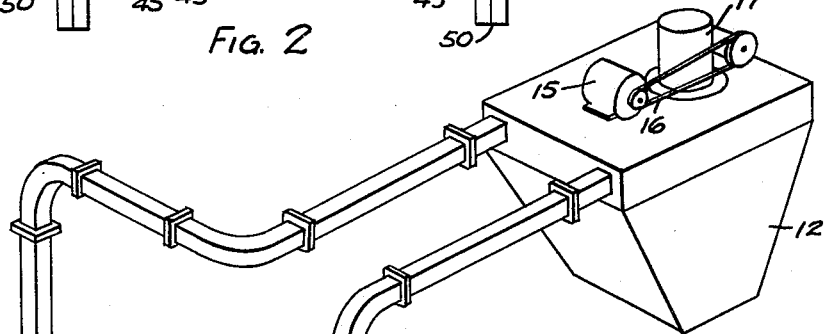
Fig. 1 shows generally a conveying system of a type with which this invention may be used.

A conveyor system of a type adapted for embodying this invention is shown generally in Fig. 1, and it includes a conveyor tube 10 and loading hopper 11, where the conveyor is loaded with the material to be transported and conveyed, and a discharge hopper 12 into which the material is discharged or unloaded. The propelling linkage shown generally in Fig. 2 is arranged in the tube and discharge hopper in the form of an endless chain. The linkage may conveniently be driven through the tube by a sprocket 14 mounted in the upper portion of the discharge hopper, the sprocket in turn being driven by such means as an electric motor 15 connected thereto through a belt 16 and a gear box 17. The propelling linkage is designed to travel easily through a tube such as that shown in Fig. 1 which follows a course curving in all directions and in which the curves may be relatively sharp.

Figure 4:
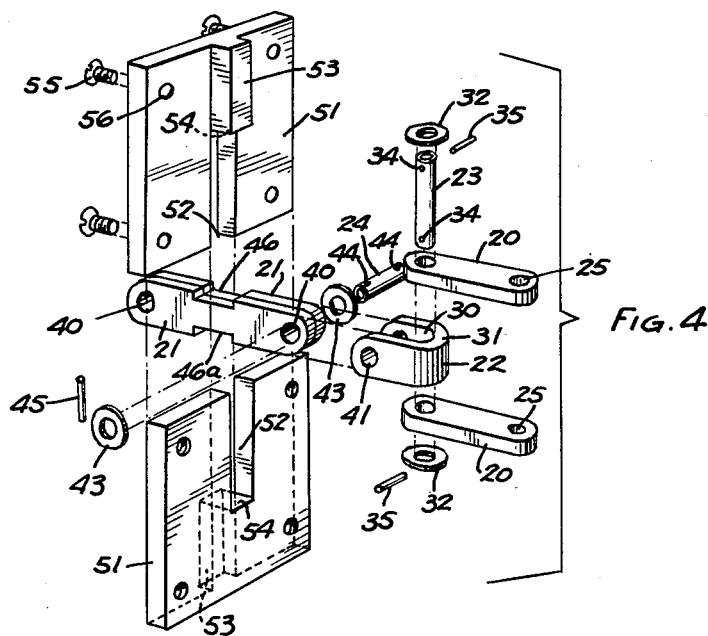
Fig. 4 is a perspective exploded view showing the individual parts of the linkage and flights.

The propelling linkage (Figs. 2 and 4) includes straight bar-shaped sprocket links 20 and straight bar-shaped flight links 21 arranged at alternate pairs and interconnected through U-shaped clevis links 22 and pintle members 23 and 24. The end portions of each sprocket link are apertured as shown at 25 and the closed end of the clevis link forms a port 30. One end of a sprocket link is pivotally secured to each side 31 of each clevis link by means of a pintle 23 extending through the aligned apertures 25 and port 30.

The pintle projects somewhat beyond the sprocket links and washers 32 are placed over the projections 33 (Fig. 2) and into engagement with the sprocket links. Each projection contains an opening 34, through which a locking pin 35 extends. The ends of the locking pins project out of the opening 34 to engage the washers 32 and thereby secure the pintles in place. The locking pins are preferably in the form of hollow sleeves held in circumferentially compressed condition by the walls of the openings 34 and thus are frictionally secured therein.

The end portions of each flight link 21 have apertures 40 therein and adjacent the ends of the legs of the clevis link have apertures 41 which are preferably of substantially the same diameter as the apertures 40. The pairs of flight links are disposed in side-by-side abutment and the end portions of the pairs are fitted nicely between the legs of the clevis link with the apertures 40 and 41 aligned. A pintle 24 projects through the aligned apertures, thereby pivotally securing the flight links to the clevis link.

The pintle 24 projects beyond the legs of the clevis link as shown at 42, and washers 43 are fitted onto the projections. Each projection has an opening 44 through which a locking pin 45 extends. These pins are preferably of the same type as the locking pins 35 and co-operate in the same manner with the adjacent washers to secure the pintle 24 in place.

The clevis link and pintles thus provide a connection between adjacent pairs of flight links and sprocket links, and this connection embodies two closely coupled pivoting joints. The axes of the pintles are substantially perpendicular to each other, thereby permitting relative flexure of adjacent pairs of links in two directions transversely of the longitudinal extent of the linkage.

Each flight link 21 has identical rectangular shaped notches or depressions 46 and 46a in its edges, and the notches in each pair of flight links are aligned. The notches are preferably located midway between the ends of the links.

Each flight or piston 50 comprises a pair of preferably identical, substantially flat square plates 51. Extending perpendicularly inwardly from the central part of one side of each plate 51 is a rectangular slot 52 which is of such a width that the combined thicknesses of the abutted flight links 21 will fit nicely therein. On one face of the plate 51 and in extension of the slot 52 is a lug or upset portion 53. The inner ends of the slot 52 and the lug 53 lie in a common plane providing the planar surface 54. Preferably, lug 53 terminates at the central portion of one side of the plate, its upset dimension is equal to the thickness of the plate proper, and it is of such a width as to fit nicely within the slot 52 of another plate 51.

Figure 5:
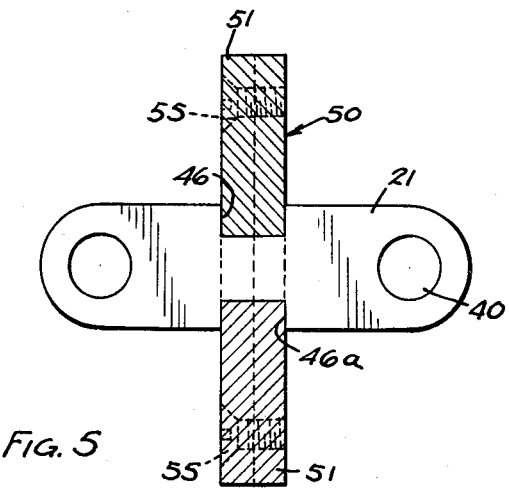
Fig. 5 is partly in elevation and partly in section showing one form of a flight.

To assemble a flight and secure it into operative position on the propelling linkage, the slot 52 of a plate 51 is slidably fitted over one edge of a pair of flight links and the planar surface 54 is seated on the inner face of the notch 46. When thus positioned, a portion of the plate including a portion of the slot 52 projects beyond the other edge of the flight links. A second plate is slidably mounted on the other edge of the flight links, the surface 54 thereof being seated on the inner surface of the other notch 46a. In so mounting the second plate, the lug 53 thereof slides into the slot 52 of the first plate and the slot 52 thereof engages the lug 53 of the first plate. The two plates are then secured firmly together in abutting and aligned relationship by such means as four bevel headed screws 55 extending through threaded openings 56 therein. A flight thus assembled presents a generally smooth planar surface on all its faces. The notches 46 and 46a are shaped and dimensioned to engage the plates 51 and lugs 53 nicely as illustrated in Fig. 5 in order to provide a substantially rigid connection between the flight links and the flights.

It is to be appreciated that in order to facilitate economy of manufacture and simplicity of assembly or disassembly or replacement of parts, various of the parts may be identically constructed. For example, the sprocket links and flight links may be identical except for the notches 46 in the latter and the washers 32 and 43 may be identical as may be the locking pins 35 and 45. Further, if desired, the flight links may be made as a single, relatively thick bar rather than as two abutted bars as in the preferred form of the invention.

Figure 3:
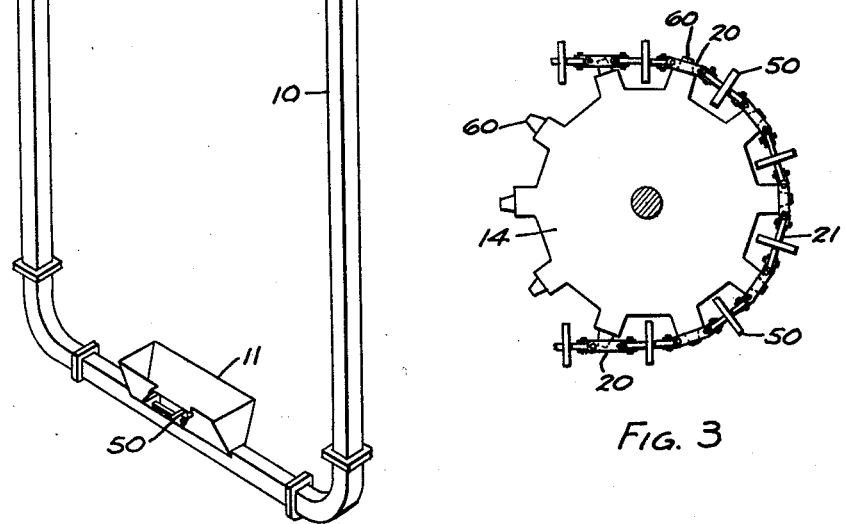
Fig. 3 shows the conveying linkage in engagement with a driving sprocket.

The propelling linkage with the flights secured thereto is disposed in the manner of an endless chain within the square conveying tube 10 (Fig. 1) and in engagement with driving sprocket 14 mounted inside of the discharge hopper 12. The pairs of sprocket links 20 are properly spaced apart by the clevis links 22 to permit the ends 60 of the teeth of the sprocket to project between them (Fig. 3). The sprocket 14 is recessed between its teeth as shown in order to accommodate the flights 50.

In use the electric motor 15, acting through the belt 16 and gear box 17, rotates the sprocket 14. The ends of the teeth 60 projecting between the sprocket links 20 engage the closed ends of the clevis links 21 and move the propelling linkage and flights through the conveyor tube 10. It is to be noted that the construction of the linkage and flights makes the direction of rotation of the sprocket immaterial. The construction is identical proceeding in either direction along the linkage from a point midway between any pair of the sprocket links. In this regard, it may also be noted that it is impossible to mount the linkage or the flights backward in the conveyor tube.

The material to be conveyed is loaded into a loading hopper 11 and from there feeds into the tube. A continual procession of flights or pistons 50 pushes the material through the tube to the discharge hopper 12. The flights leave the tube upon entering the hopper, and the material is deposited therein. As illustrated in Fig. 1, the conveyor tube may have a number of curves therein between the loading hopper and the discharge hopper. These curves may be more or less sharp and may be in various directions transversely of the linkage. The two directional flexure facilitated by the two closely coupled joints at each clevis link permits the linkage to conform to the curves with ease.

Because of friction between the flights and the tube there is a certain amount of wear on the flights which requires their eventual replacement and the wearing is hastened where the material conveyed is abradant in nature. It is an important part of this invention that the flights 50 may be removed and replaced quickly and easily without disassembly of any other part of the propelling linkage. This is done merely by removing the screws 55 and slidably disengaging the component plates 51 from each other and from the flight links 21. New plates 51 may then be slidably assembled as above described and secured in place by the screws 55. No other part of the linkage need be disturbed. Flights may thus be removed and replaced with minimal effort, expense of the loss of operating time.

I claim:

1. Propelling linkage for use in a tube type conveyor comprising, a concatenate series of sprocket links and flight links connected in alternate arrangement through generally U-shaped clevis links each having a bight portion and legs with aligned openings therein, each sprocket link including two spaced apart elements having apertured end portions which engage opposite sides of said bight portions of adjacent clevis links, tubular pin means projecting removably through the bight portion of each clevis link and through the apertures in said elements engaged therewith for detachably interconnecting said sprocket links and clevis links, said flight links being adapted for detachable connection to flights in a conveyor with which said linkage is adapted to be used, said clevis links being spaced apart in a direction longitudinal of said linkage by a distance at least as great as the thickness of such flights, said flight links being disposed between the legs of adjacent clevis links and having openings aligned with said openings in the clevis link legs, tubular pin means projecting removably through the aligned openings in said flight links and clevis link legs for detachably interconnecting the same, said tubular pin means projecting outwardly of the respective links which they interconnect, the outwardly projecting portions of said pin means having generally diametrically opposite holes therein, and a locking pin extending through each pair of said holes, each of said locking pins projecting radially outwardly of its respective tubular pin for securing the latter in link interconnecting relation, said locking pins being functionally retained in said holes but removable therefrom whereby to facilitate disassembly and reassembly of said linkage for replacement of flights on said flight links and the like.

2. Propelling linkage for use in a tube type conveyor comprising, a concatenate series of sprocket links and flight links connected in alternate arrangement through connecting links each having means forming openings having generally perpendicular axes, each sprocket link including two spaced apart elements having portions with openings engaging opposite sides of adjacent connecting links, tubular pin means projecting removably through openings in said connecting links and said elements engaged therewith for detachably interconnecting said sprocket links and connecting links, said flight links being adapted for detachable connection to flights in a conveyor with which said linkage is adapted to be used, said flight links having openings therein aligned with openings in said connecting links having axes perpendicular to the axes of the openings through which said tubular pin means extend, tubular pin means projecting slidably removably through the aligned openings in said flight links and connecting links for detachably interconnecting the same, said tubular pin means projecting outwardly of the respective links which they interconnect, the outwardly projecting portions of said pin means having generally diametrically opposite holes therein, and a locking pin extending through each pair of said holes, each of said locking pins projecting radially outwardly of its respective tubular pin for securing the latter in link interconnecting relation, said locking pins being frictionally retained in said holes but being removable therefrom whereby to facilitate disassembly and reassembly of said linkage for replacement of flights on said flight links and the like.

References Cited in the file of this patent

UNITED STATES PATENTS

| | | |
|---|---|---|
| 570,213 | Amborn | Oct. 27, 1896 |
| 1,113,309 | Coldren | Oct. 13, 1914 |
| 1,860,597 | Renold | May 31, 1932 |
| 1,983,548 | Knox et al. | Dec. 11, 1934 |
| 2,061,223 | Cunningham et al. | Nov. 17, 1936 |
| 2,686,431 | Simpkin | Aug. 17, 1954 |
| 2,779,454 | Sigardson | Jan. 29, 1957 |

FOREIGN PATENTS

| | | |
|---|---|---|
| 21,645 | Great Britain | Nov. 26, 1892 |